United States Patent
Kanakasabai et al.

(10) Patent No.: US 12,296,698 B2
(45) Date of Patent: *May 13, 2025

(54) DEVICE, SYSTEM AND METHOD FOR DETECTION OF A FOREIGN OBJECT

(71) Applicant: GE Intellectual Property Licensing, LLC, Niskayuna, NY (US)

(72) Inventors: Viswanathan Kanakasabai, Bangalore (IN); Deepak Aravind, Bangalore (IN); Suma Memana Narayana Bhat, Bangalore (IN); Adnan Kutubuddin Bohori, Bangalore (IN)

(73) Assignee: GE Intellectual Property Licensing, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,890

(22) Filed: Jun. 21, 2023

(65) Prior Publication Data

US 2023/0331103 A1  Oct. 19, 2023

Related U.S. Application Data

(63) Continuation of application No. 17/046,574, filed as application No. PCT/US2019/027789 on Apr. 17, 2019, now Pat. No. 11,685,269.

(30) Foreign Application Priority Data

Apr. 19, 2018 (IN) .............................. 201841014936

(51) Int. Cl.
*B60L 53/124* (2019.01)
*G01V 3/10* (2006.01)
(Continued)

(52) U.S. Cl.
CPC ............ *B60L 53/124* (2019.02); *G01V 3/101* (2013.01); *H02J 50/10* (2016.02); *B60K 6/28* (2013.01);
(Continued)

(58) Field of Classification Search
CPC ..... B60L 53/124; B60L 53/122; G01V 3/101; G01V 3/107; H02J 50/10; H02J 50/60;
(Continued)

(56) References Cited

U.S. PATENT DOCUMENTS 1,866,751 A * 7/1932 Butow .................... H01F 38/28
                                                          361/87
4,862,493 A * 8/1989 Venkataraman ....... G01D 4/004
                                                          714/15
(Continued)

FOREIGN PATENT DOCUMENTS

| CN | 101394022 | 11/2012 |
|---|---|---|
| CN | 107306054 | 11/2020 |

(Continued)

OTHER PUBLICATIONS

"European Application No. 19788677.3 European Search Report", Nov. 23, 2021, 9 pages.

(Continued)

*Primary Examiner* — Daniel R Miller
(74) *Attorney, Agent, or Firm* — DeLizio, Peacock, Lewin & Guerra, LLP

(57) ABSTRACT

A detection device (100) includes a detection mat (102) having a plurality of detection coils (106), and at least one pair of groups of detection coils (106), the pair of groups of detection coils (106) includes first and second groups of detection coils (106). The first and second group of detection coils (106) comprises first and second first and second impedance values. The detection device (100) includes one
(Continued)

or more drive sub-systems (112) and a comparison sub-system (112). The drive sub-systems (112) are operatively coupled to the detection mat (102) and configured to excite at least one pair of groups of detection coils (106). The comparison sub-system (114) is operatively coupled to the detection mat (102) and configured to receive a differential current signal from the pair of groups of detection coils (106), the comparison sub-system (114) is configured to generate a control signal based on the differential current signal.

15 Claims, 9 Drawing Sheets

(51) Int. Cl.
  *H02J 50/10* (2016.01)
  *B60K 6/28* (2007.10)
(52) U.S. Cl.
  CPC ....... *B60Y 2200/91* (2013.01); *B60Y 2200/92* (2013.01); *B60Y 2300/91* (2013.01)
(58) Field of Classification Search
  CPC .. B60K 6/28; B60Y 2200/91; B60Y 2200/92; B60Y 2300/91; Y02T 10/70; Y02T 10/7072; Y02T 90/14
  See application file for complete search history.

(56) References Cited

U.S. PATENT DOCUMENTS

| | | | |
|---|---|---|---|
| 8,248,028 B2 | 8/2012 | Toya et al. | |
| 9,178,361 B2 | 11/2015 | Liu et al. | |
| 9,260,026 B2 | 2/2016 | Miller et al. | |
| 9,404,954 B2 | 8/2016 | Roy et al. | |
| 9,410,823 B2 | 8/2016 | Widmer et al. | |
| 9,825,486 B2 | 11/2017 | Liu et al. | |
| 10,361,594 B2 | 7/2019 | Huang | |
| 10,371,848 B2 | 8/2019 | Roy et al. | |
| 10,804,748 B2 | 10/2020 | Wu et al. | |
| 2004/0003015 A1* | 1/2004 | Manor .................... | G06F 7/535 708/605 |
| 2009/0145778 A1* | 6/2009 | Allmendinger ...... | G01N 27/419 204/406 |
| 2010/0148907 A1* | 6/2010 | Younsi .................... | H01F 38/30 336/180 |
| 2013/0099592 A1 | 4/2013 | Abe | |
| 2013/0128396 A1 | 5/2013 | Danesh et al. | |
| 2014/0015329 A1 | 1/2014 | Widmer et al. | |
| 2014/0103733 A1 | 4/2014 | Irie et al. | |
| 2014/0111019 A1 | 4/2014 | Roy et al. | |
| 2014/0111154 A1 | 4/2014 | Roy et al. | |
| 2014/0375256 A1 | 12/2014 | Lee et al. | |
| 2015/0022012 A1 | 1/2015 | Kim et al. | |
| 2015/0109000 A1 | 4/2015 | Sieber et al. | |
| 2015/0137801 A1 | 5/2015 | Raedy et al. | |
| 2015/0276965 A1 | 10/2015 | Turki | |
| 2015/0311725 A1 | 10/2015 | Yamamoto et al. | |
| 2016/0282500 A1 | 9/2016 | Filippenko et al. | |
| 2016/0285312 A1 | 9/2016 | Maniktala | |
| 2016/0336759 A1 | 11/2016 | Yamamoto et al. | |
| 2017/0025904 A1 | 1/2017 | Roy et al. | |
| 2017/0054333 A1 | 2/2017 | Roehrl et al. | |
| 2017/0317536 A1 | 11/2017 | Marson et al. | |
| 2017/0324252 A1 | 11/2017 | Yamamoto et al. | |
| 2017/0328740 A1 | 11/2017 | Widmer et al. | |
| 2017/0353061 A1 | 12/2017 | Maniktala | |
| 2017/0363763 A1 | 12/2017 | Yamamoto et al. | |
| 2018/0015832 A1 | 1/2018 | Nguyen et al. | |
| 2018/0026482 A1 | 1/2018 | Asano et al. | |
| 2018/0054091 A1 | 2/2018 | Liu et al. | |
| 2018/0083349 A1 | 3/2018 | Seiber | |
| 2018/0166928 A1 | 6/2018 | Wu et al. | |
| 2018/0316229 A1 | 11/2018 | Anwer et al. | |
| 2018/0366985 A1 | 12/2018 | Henkel et al. | |
| 2019/0027973 A1 | 1/2019 | Baek et al. | |
| 2019/0097471 A1 | 3/2019 | Pantic et al. | |
| 2019/0103771 A1 | 4/2019 | Piasecki et al. | |
| 2019/0331822 A1 | 10/2019 | Miyamoto | |
| 2019/0363588 A1 | 11/2019 | Daetwyler et al. | |
| 2020/0232819 A1 | 7/2020 | Widmer et al. | |
| 2020/0266671 A1 | 8/2020 | Choi et al. | |
| 2020/0290467 A1 | 9/2020 | Gao et al. | |
| 2020/0328616 A1 | 10/2020 | Van Wageningen et al. | |
| 2021/0078426 A1 | 3/2021 | Bhat et al. | |
| 2021/0138917 A1 | 5/2021 | Kanakasabai et al. | |
| 2021/0176571 A1* | 6/2021 | Snyder ................. | H04R 25/552 |
| 2021/0215845 A1 | 7/2021 | Tejeda et al. | |

FOREIGN PATENT DOCUMENTS

| | | | | |
|---|---|---|---|---|
| DE | 102014105398 B4 * | 12/2018 | ........... | A61B 5/0059 |
| EP | 1818672 B1 * | 8/2012 | ............. | G01N 27/36 |
| EP | 3093958 | 11/2016 | | |
| JP | 2014126513 | 7/2014 | | |
| JP | 2015216828 | 12/2015 | | |
| JP | 2015223009 | 12/2015 | | |
| JP | 2016502385 | 1/2016 | | |
| JP | 2016134980 | 7/2016 | | |
| JP | 2016220523 | 12/2016 | | |
| KR | 1020180020166 | 2/2018 | | |
| KR | 20200064934 | 6/2020 | | |
| WO | 2011142419 | 11/2011 | | |
| WO | 2019057777 | 3/2019 | | |
| WO | 2019204376 | 10/2019 | | |
| WO | 2019204377 | 10/2019 | | |
| WO | 2019204379 | 10/2019 | | |
| WO | 2019219208 | 11/2019 | | |
| WO | 2022177948 | 8/2022 | | |

OTHER PUBLICATIONS

"India Application No. 201841014936 Examination Report", Jan. 29, 2020, 6 pages.
"India Application No. 201841014937 Examination Report", Jan. 21, 2020, 6 pages.
"Japan patent application No. 2020-556814 First Office Action", Feb. 15, 2023, 3 pages.
"PCT Application No. PCT/US2019/027787 International Preliminary Report on Patentability", Oct. 29, 2020, 8 pages.
"PCT Application No. PCT/US2019/027787 International Search Report", Aug. 9, 2019, 12 pages.
"PCT Application No. PCT/US2019/027789 International Search Report and Written Opinion", Aug. 7, 2019, 12 pages.
"PCT Application No. PCT/US2022/016543 International Search Report and Written Opinion", Aug. 11, 2022, 41 pages.
"PCT Application No. PCT/US2022/016543 Invitation to Pay Additional Fees and, Where Applicable, Protest Fee", May 23, 2022, 13 pages.
"U.S. Appl. No. 17/046,574 Office Action", Apr. 14, 2022, 20 pages.
"U.S. Appl. No. 17/048,424 Final Office Action", Sep. 16, 2022, 23 pages.
"U.S. Appl. No. 17/048,424 Non Final Office Action", Apr. 5, 2023, 24 pages.
"U.S. Appl. No. 17/048,424 Office Action", Jan. 21, 2022, 17 pages.
"India Application No. 202111006541 Examination Report", Feb. 5, 2024, 7 pages.
"Korea patent application No. 10-2020-7033326 Request for the Submission of an Opinion", Jan. 26, 2024, 2 pages.
"U.S. Appl. No. 17/048,424 Final Office Action", Jan. 5, 2024, 18 pages.
"Japan Patent application No. 2023-191894 Notice of Allowance", Sep. 3, 2024, 2 pages.
"China application No. 201980026147.9 First Office Action", Sep. 24, 2024, 8 pages.
"China Application No. 201980026147.9 Notice of Examination", Dec. 13, 2024, 4 pages.

(56) References Cited

OTHER PUBLICATIONS

"Korea application No. 10-2023-7029121 Request for Submission of Opinion", Jan. 6, 2025, 10 pages.
"U.S. Appl. No. 18/447,538 Non Final Office Action", Nov. 8, 2024, 10 pages.
"U.S. Appl. No. 18/264,662 Non Final Office Action", Oct. 18, 2024, 10 pages.
"U.S. Appl. No. 18/447,433 Non Final Office Action", Oct. 25, 2024, 8 pages.

* cited by examiner

DEVICE, SYSTEM AND METHOD FOR DETECTION OF A FOREIGN OBJECT

CROSS-REFERENCE TO RELATED APPLICATIONS

This application is a continuation of, and claims priority benefit of, U.S. patent application Ser. No. 17/046,574, filed Oct. 9, 2020, which is the National Stage of International Application No. PCT/US2019/027789, filed Apr. 17, 2019, which claims the priority benefit of, India Patent Application Number 201841014936, filed Apr. 19, 2018, entitled "DEVICE, SYSTEM AND METHOD FOR DETECTION OF A FOREIGN OBJECT," the contents of each of which are hereby incorporated by reference.

BACKGROUND

Embodiments of the present specification relate to a detection device, and more particularly, embodiments of the present specification relate to a detection device for a foreign object detection in an operative environment of a system.

Conventional wireless power transfer (WPT) systems work on a principle of inductive power transfer to wirelessly transfer energy from one device to another. Typically, in WPT systems, a primary power device, such as a transmitter transmits power wirelessly to a secondary power device, referred to as a receiver. The transmitter and receiver include respective coils that are disposed in operative proximity during operation of the WPT system. When an electrical current is passed through the transmitter coils, the generated magnetic field induces an electromotive force in the receiver coil, thereby wirelessly transferring power from the transmitter to the receiver.

In such WPT systems, if there is any metal object, such as a metallic can or aluminum foil, present between the transmitter and receiver coils during wireless power transfer, the metal object may be undesirably heated up due to eddy currents. This may result in safety hazards, such as fire safety hazards. Further, the efficiency of wireless power transfer process may be inadvertently affected or the whole process may be completely disrupted.

There are a variety of different methods for detecting foreign objects in WPT systems. These include detecting presence of a foreign object by variation in frequency of the current in a primary coil, detecting imbalanced disparities in current and voltages in the primary coil, based on measurements of power drawn from the primary coil, and the like. Also, in some of the detection methods there may be some delay in detection of the foreign objects after the wireless power transfer is initiated. The foreign object continues to draw power during this period which results in wastage of power.

BRIEF DESCRIPTION

In one embodiment, a detection device includes a detection mat having a plurality of detection coils, and at least one pair of groups of detection coils, where the pair of groups of detection coils includes first and second groups of detection coils. The first group of detection coils comprises a first impedance value, and a second group of detection coils comprises a second impedance value. Further, the detection device includes one or more drive sub-systems and a comparison sub-system. The drive sub-systems are operatively coupled to the detection mat and configured to excite at least one pair of groups of detection coils. The comparison sub-system is operatively coupled to the detection mat and configured to receive a differential current signal from the at least one pair of groups of detection coils, where the comparison sub-system is configured to generate a control signal based on the differential current signal.

In another embodiment, a detection system includes a detection device and a wireless power transfer (WPT) system. The detection device includes a detection mat having a plurality of detection coils, and at least one pair of groups of detection coils, where the pair of groups of detection coils includes first and second groups of detection coils. The first group of detection coils comprises a first impedance value, and a second group of detection coils comprises a second impedance value. Further, the detection device includes one or more drive sub-systems and a comparison sub-system. The drive sub-systems are operatively coupled to the detection mat and configured to excite at least one pair of groups of detection coils. The comparison sub-system is operatively coupled to the detection mat and configured to receive a differential current signal from the at least one pair of groups of detection coils, where the comparison sub-system is configured to generate a control signal based on the differential current signal. The WPT system includes a primary power source configured to supply power in a form of an alternating current (AC) voltage signal. The WPT system further includes a transmitter unit having at least one transmitter coil, where the transmitter unit is configured to receive the AC voltage signal from the primary power source. Further, the transmitter unit is configured to generate a primary magnetic field in response to the received AC voltage signal, and where the detection mat is operatively coupled to the transmitter unit. The WPT system further includes a receiver unit comprising at least one receiver coil and configured to receive at least a portion of the primary magnetic field generated by the transmitter unit. Moreover, the WPT system includes a control unit operatively coupled to the detection device and configured to receive the control signal from the detection device, and control the supply of power to the transmitter unit based on the control signal.

In yet another embodiment, a method includes utilizing a detection device that includes a detection mat having a plurality of detection coils, and at least one pair of groups of detection coils, where the pair of groups of detection coils includes first and second groups of detection coils. The first group of detection coils comprises a first impedance value, and a second group of detection coils comprises a second impedance value. The method further includes exciting at least one pair of groups of detection coils and determining a differential current signal from the at least one pair of groups of detection coils. Moreover, the method includes generating a control signal based on the differential current signal, and transmitting the control signal.

DRAWINGS

These and other features and aspects of embodiments of the invention will become better understood when the following detailed description is read with reference to the accompanying drawings in which like characters represent like parts throughout the drawings, wherein.

DETAILED DESCRIPTION

Figure 1:
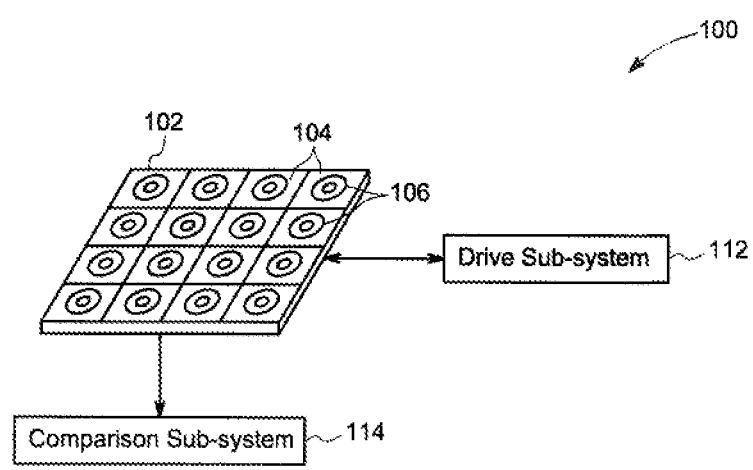
FIG. 1 is a diagrammatical illustration of an example detection device for detecting presence of a foreign object, in accordance with aspects of the present specification.

Embodiments of the present specification relate to a detection device, a detection system and a method for detection of a foreign object. In certain embodiments, the detection device may be used for detection of a foreign object in a wireless power transfer (WPT) system. As used herein, the term "foreign object" refers to objects that are electrically conductive or have detectable magnetic permeability and that are not part of a system but are inadvertently present in an operative environment of the system. Non-limiting examples of foreign objects may include a ferrous object, a tin can, or other electrically conductive or ferrous objects. In one example, a can or a bunch of keys are considered as foreign objects in the operative environment of the WPT system.

As used herein, the term "primary magnetic field" refers to a magnetic field that is induced by a transmitter unit, such as the transmitter unit of the WPT system. The term "operative environment" is defined by the primary magnetic field in the system, where the primary magnetic field of a transmitter unit is detectably present and can detectably interact with the foreign object. By way of example, a foreign object present in the operative environment of the WPT system may experience an increase in temperature due to interaction with the primary magnetic field.

As used herein, the term "group of detection coils" refers to a singular detection coil or two or more coils, where detection coils of each individual group are electrically coupled to one another. Further, the term "pair of groups of detection coils" refers to two such groups of detection coils.

Some electric vehicles (EVs) and hybrid vehicles are charged by wireless power transfer or inductive power transfer using WPT systems. The WPT systems are primarily made of two parts, a transmitter unit that is part of a charging station, and a receiver unit that is disposed in an electric vehicle (EV). The transmitter unit of the charging station is inductively coupled to the receiver unit of the EV. Typically, transfer of power is initiated between coils of the transmitter and receiver units when the receiver coil of EV is brought in the operative environment of the transmitter coil and power supply to the transmitter unit is started.

When a foreign object made of electrically conductive material or ferrous material is inadvertently placed in an operative environment of the WPT, the foreign object may interact with a magnetic field generated by the transmitter unit. Consequently, the foreign object may inadvertently intercept the magnetic field and draw power from the transmitter unit via the magnetic field. Accordingly, the power drawn by the foreign object results in power wastage and undesirable heating up of the foreign object. If not addressed in a timely manner, or if gone unnoticed, the temperature of the foreign object may increase to values that may render the foreign object unsafe to handle, and may also cause safety risks. Consequently, it is desirable to detect the presence of a foreign object to prevent power wastage and avoid the risk of an unsafe environment.

FIG. 1 illustrates a detection device 100 having a detection mat 102 having a plurality of detection coils 106, and at least one pair (not shown in FIG. 1) of groups of detection coils 106. At least one pair of groups of detection coils 106 includes a first group of detection coils 106 and a second group of detection coils 106, where the first group of detection coils 106 have a first impedance value, and a second group of detection coils 106 have a second impedance value. The detection device 100 also includes one or more drive sub-systems 112 operatively coupled to the detection mat 102 and configured to excite at least one pair of groups of detection coils 106. Further, the detection device 100 includes a comparison sub-system 114 operatively coupled to the detection mat 102 and configured to receive a differential current signal from the at least one pair of groups of detection coils 106. The comparison sub-system 114 is configured to generate a control signal based on the differential current signal.

In certain embodiments, the detection device 100 is configured to detect presence of a foreign object in an operating environment of a wireless power transfer (WPT) system (not shown in FIG. 1). The presence of the foreign object in the operative environment of the WPT system may result in a change in impedance values of one or more detection coils 106. This change in the impedance values of the detection coils 106 is used to ascertain presence of the foreign object. The groups of detection coils 106 will be explained in greater detail with regard to FIGS. 2A-2B. and 3A-3B.

Further, the detection mat 102 may include several geometric locations, also referred to as "detection zones" 104. The detection zones 104 define discrete regions of the detection mat 102, where each detection zone 104 includes one or more groups of detection coils 106. It may be noted that the detection zones 104 may not be physically separated or isolated from one another, the detection zones 104 may be electrically isolated from one another. Further, the detection zones 104 may have geometric or non-geometric shapes.

The detection mat 102 may be a flexible mat, a conformable mat, a rigid mat or a plug and play mat, a standalone mat, or combinations thereof. It may be noted that a surface area of the detection mat 102 may be greater than or equal to a surface area of a transmitter unit on which the detection mat 102 is disposed. A substrate of the detection mat 102 may be made of electrically insulating material. The detection mat 102 may further include a mechanical wear resistant material to withstand movement of an electric vehicle over it. The detection mat 102 may further be designed for outdoor application and designed to withstand temperature, humidity and may be resistant to water ingress.

In some embodiments, the detection coils 106 may be disposed on a substrate of the detection mat 102 or may be embedded in the substrate of the detection mat 102 for user safety and aesthetics. In some other embodiments, the detection coils 106 may be printed, molded, woven, or additively manufactured on the substrate of the detection mat 102.

The detection coils 106 are electromagnetic coils. In the illustrated embodiment of FIG. 1, the detection coils 106 are used for representative purposes, it may be noted that each detection coil 106 may include spiral or other coil topologies. Further, each detection zone 104 may have one or more detection coils 106. In certain embodiments, the groups of detection coils 106 may include various coil topologies, shapes, and geometrical arrangement of the detection coils 106. Non-limiting examples of shapes of the detection coils 106 may include helical coils, spiral coils, non-circular, and the like. Different detection coils 106 or groups of detection coils 106 present on the detection mat 102 may have same or different impedance values.

Each pair of groups of detection coils 106 includes two groups that are disposed at same or different geometric locations on the detection mat 102 to form the pair of groups of detection coils 106. By way of example, the two groups of the pair may be disposed at the same detection zone 104, or may be disposed in two different detection zones 104. In a non-limiting example, each group of detection coils 106 may include concentric coils, adjacently disposed coils, a side-by-side arrangement of coils. Further, one or more groups of detection coils 106 may be disposed in a single plane, or two or more layers. The detection coils 106 within a group of detection coils 106 may be connected in a series connection, a parallel connection, or a combination of the series and parallel connections.

In some embodiments, a pair of groups of detection coils 106 includes concentric coils. In a non-limiting example, inductance value of one of the two concentric coils is different than an inductance value of another concentric coil. By way of example, while an inductance value of one concentric coil of the pair of concentric coils may be represented by $L$, an inductance value of another concentric coil of the pair of concentric coils may be represented as $nL$.

The drive-subsystem 112 includes one or more drive units and a drive controller. The drive-subsystem 112 is operatively coupled to the detection mat 102 and configured to excite one or more pairs of groups of detection coils 106. The drive sub-system 112 may be configured to intermittently or periodically excite determined groups of detection coils 106 of the detection device 100, where the determined groups of detection coils form one or more pairs of groups of detection coils 106. The drive sub-system 112 may be configured to excite the pairs of groups of detection coils 106 belonging to same or different detection zones 104. In certain embodiments, the drive sub-system 112 may be configured to excite the groups of detection coils 106 that are symmetrically located with respect to a primary magnetic field (not shown in FIG. 1) of the WPT system.

In one example, the drive sub-system 112 may be configured to simultaneously or sequentially excite groups of a pair of groups of detection coils 106. Additionally, or alternatively, the drive sub-system 112 may be configured to simultaneously or sequentially excite two or more pairs of groups of detection coils 106 of the detection mat 102. In one example, the drive sub-system 112 may be configured to scan the detection mat 102 for the presence of foreign object. The detection of presence of the foreign object may be completed prior to commencing the wireless power transfer for an apparatus (such as EV). Further, the detection of presence of the foreign object may also be performed periodically or intermittently during the process of the wireless power transfer of the apparatus (such as EV).

As will be described in detail with respect to FIGS. 3A-3E in one example, each pair of groups of detection coils 106 may be coupled to a respective drive sub-system, in another example, two or more pairs of groups of detection coils 106 may be coupled to different drive units sharing a common drive controller.

In some embodiments, the drive unit of the drive sub-system 112 is configured to provide a voltage signal to one or more groups of detection coils 106, and the drive controller is configured to control operation of the drive unit. To that end, the drive controller switches on the drive sub-system 112 to excite the one or more groups of detection coils 106, and switches off the drive sub-system 112 when the groups of detection coils 106 do not need to be excited. In certain embodiments, the drive sub-system 112 includes one or more of an inverter, a converter, a linear amplifier, an electronic switch, or combinations thereof. Switching of the drive sub-system 112 may be performed by an electronic switch, such as a bi-directional switch, a semiconductor switch, a mechanical switch, such as a relay, a contractor, or combinations thereof. In certain embodiments, the drive sub-system 112 may draw power from a primary power source that is configured to power the transmitter unit of the WPT system. Alternatively, the drive sub-system 112 may have an individual power source, such as, but not limited to a battery.

It may be noted that in operation, a foreign object, if present on the detection mat 102, may inductively couple to one or more detection coils 106, thereby influencing resultant impedance values of those particular group(s) of the detection coils 106. Further, it may be noted that inherent impedance values of different groups of detection coils 106 of the detection device 100 may be same or different in the absence of the foreign object. Further, inherent impedance values of the two groups of a pair of groups of detection coils 106 may be same or different in absence of the foreign object. In some of these embodiments, the detection mat 102 further includes a compensator element (not shown in FIG. 1) operatively coupled to at least one of the groups of the pair of groups of the detection coils 106 to provide similar resultant impedance values from each of the two groups of the pair of groups of detection coils 106 in absence of the foreign object. In some other embodiments, the drive controller may be used to provide voltage compensation for one of the groups of the pair of groups of detection coils 106. By way of example, the drive controller of the drive sub-system 112 provides different voltage signals to the two groups of the pair of groups of detection coils 106 such that the two groups of the pair of groups of detection coils 106 are driven by identical currents that are similar in magnitude and phase in the absence of the foreign object.

The comparison sub-system 114 is operatively coupled to the detection mat 102 and configured to receive one or more differential current signals from the detection mat 102. The comparison sub-system 114 is configured to determine a detection voltage signal based on the differential current signal. It may be noted that a value of the differential current signal may be very small and non-detectable in absence of a foreign object. Further, due to inductive coupling between the foreign object and one or more detection coils 106, the value of the differential current signal may be a detectable non-zero value in presence of the foreign object.

The detection device 100 may be a standalone device that can be used for detecting presence of a foreign object in systems, such as, but not limited to, WPT systems. To that end, the detection device 100 may be used with existing WPT systems to detect presence of a foreign object before and/or during wireless power transfer. In addition to the detection mat 102, drive sub-system 112, and a comparison sub-system 114, the detection device 100 may also include a communication unit (not shown in FIG. 1) which enables the detection device 100 to communicate with the system in which it is used. By way of example, the communication unit may enable the detection device 100 to communicate with a WPT system as per society of automotive engineers (SAE) standards. The communication unit may be used to communicate the detection voltage signal to a control unit of the WPT system to assess whether to continue the power supply to the transmitter unit of the WPT system.

Advantageously, the detection device 100 of the present technique is configured to detect presence of even relatively smaller foreign objects in the operative environment of the WPT system. In one example, the foreign object may have a surface area of 2 sq. cm. or more.

Figure 2A:
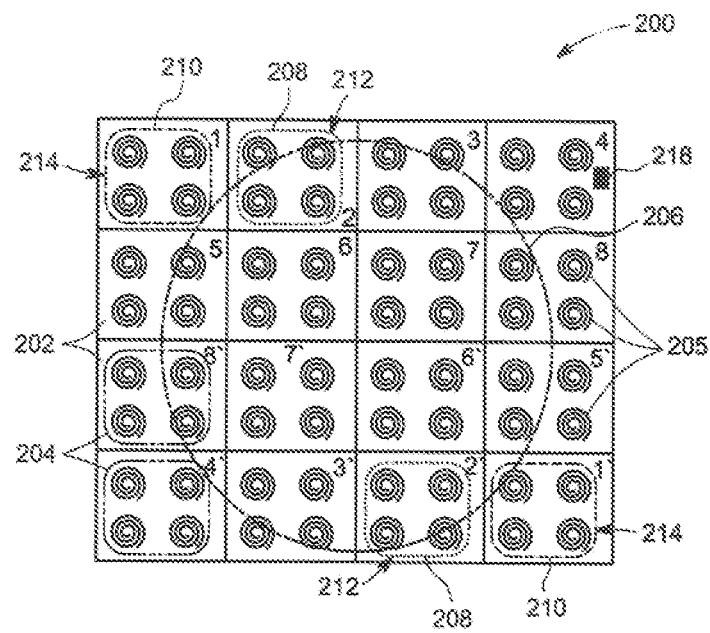
FIGS. 2A-2B are diagrammatical representations of example pairs of groups of detection coils, in accordance with aspects of the present specification.
Figure 2B:
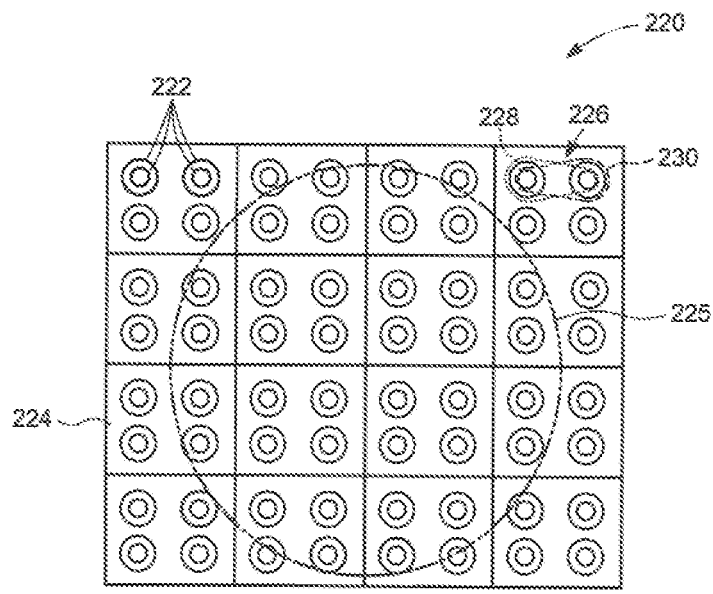

Referring now to FIGS. 2A-2B, in certain embodiments, one or more pairs of groups of detection coils of a detection device may be excited to determine a differential current signal from a detection mat, where the differential current signal is used to determine presence or absence of a foreign object. It may be noted that each of the two individual groups of the pair of detection coils may include one or more detection coils.

In certain embodiments, the first and second groups of pairs of groups of detection coils are symmetrically disposed with respect to a primary magnetic field. Further, the first and second groups of pairs of groups of detection coils are disposed in the same geometric region on the detection mat. In some embodiments, the first and second groups of pairs of groups of detection coils include structurally similar arrangement of detection coils. Further, in certain embodiments, the first and second impedance values of the groups of pair of groups of detection coils are similar in absence of the foreign object in the operative environment of the WPT system. As used herein, similar impedance values refer to impedance values having a variation of less than or equal to ±0.5% of one another. By way of example, an impedance value of a first group may be within −0.5% of an impedance value of a second group, where the first and second groups form a pair of groups of detection coils.

In some other embodiments, the first and second impedance values are dissimilar in the absence of the foreign object. In some of these embodiments, the detection mat may include a compensator element operatively coupled to one of the first and second groups of pairs of groups of detection coils to compensate a difference in impedance values of the first and second groups of detection coils 106. In some embodiments, the first and second impedance values are dissimilar in absence of the foreign object, and wherein the one or more drive sub-systems further comprise a drive controller configured to provide different voltage signals to the first and second groups of detection coils such that the first and second groups of the pair of groups of detection coils are driven by identical currents that are similar in magnitude and phase in absence of the foreign object.

As will be described with respect to FIG. 2A, the detection coils of a particular pair of groups of detection coils are symmetrically disposed with respect to a primary magnetic field and hence are subjected to similar strength of the primary magnetic field. As will be described with respect to FIG. 2B, groups of a pair of groups of detection coils may be disposed in the same geometric region of the detection mat, therefore the groups may experience similar strength of the primary magnetic field. In some embodiments, each group of the pair of groups of detection coils includes the same impedance values in the absence of the foreign object in the operative environment of the WPT system. In some other embodiments, the two groups of the pair of groups of detection coils have different impedance values. In these embodiments, the two groups of a pair of detection coils may provide negligible and non-detectable amount of differential current in association with a compensator element, or with the help of a drive controller, however, in the presence of a foreign object, when one or more detection coils of a group belonging to the pair of groups of detection coils electrically couples with the foreign object, and alters the net impedance of the group of detection coils, this results in difference in the current drawn by the two groups of the pair of groups of detection coils. As a result, the differential current, which is a difference between an input current for one of the two groups of the pair and an input current from the other group of the pair of groups of detection coils attains a detectable value.

FIG. 2A illustrates an exemplary detection mat 200 having a plurality of detection zones 202 having groups 204 of detection coils 205. In the non-limiting illustrated embodiment, the detection mat 200 is shown as having 4×4 array of detection zones 202, and each detection zone 202 is illustrated as having 4 groups 204 of detection coils 205, however, it may be noted that the number of detection zones 202 in the detection mat 200, and number of groups 204 in each detection zone 202 may vary and are merely for illustrative purposes. Further, although the detection mat 200 is shown to have 16 detection zones 202 in the illustrated example, it may be noted that the number of detection zones 202 in a detection mat, such as the detection mat 200, may be one or more. Further, each group 204 may include one or more detection coils 205. Moreover, the spiral shape of the detection coils 205 of the groups 204 is for illustrative purposes, the detection coils 205 may be of shapes, such as, but not limited to, a circular shape, a non-circular shape, a spiral shape, a helical shape, or combinations thereof. The detection mat 200 may be disposed on a transmitter unit (not shown in FIG. 2A). Further, dotted circle 206 represents a transmitter coil of a transmitter unit disposed below the detection mat 200.

Any two groups 204 of detection coils that are likely to be subjected to similar strength of the primary magnetic field may be paired to form a pair of groups of detection coils for detecting presence of a foreign object. Several plausible pairs of groups 204 of detection coils 205 are represented by n-n'. By way of example, the groups 204 referred to by reference numerals 208 are symmetrically disposed with respect to the transmitter coil 206 or the primary magnetic field of the transmitter unit, and form a pair 212 of groups 208 of detection coils. Similarly, groups 210 are symmetrically disposed with respect to the primary magnetic field of the transmitter unit, and form another pair 214 of groups 210 of detection coils. It may be noted that other pairs of groups 204 of detection coils 205 other than 212, 214, n-n' may also be possible.

In certain embodiments, when the detection mat 200 is disposed on the transmitter unit, for detecting presence of a foreign object in the operative environment of a WPT system (not shown in FIG. 2A), detection coils 205 of one or more pairs of groups 204 may be excited. By way of example, one of the two pairs 212 or 214 may be excited by a drive sub-system. Further, in instances where impedance values of the two groups of a pair of groups are dissimilar, a compensator element 218 may be operatively coupled to at least one of the groups 204 of the pair of groups 204 of the detection coils 205 to provide similar resultant impedance values from each of the two groups 204 of the pair of groups of detection coils 205 in absence of the foreign object.

FIG. 2B represents a detection mat 220 having a plurality of detection zones 224 having two or more detection coils 222. The detection device 220 may be disposed on a transmitter unit (not shown in FIG. 2B). In the illustrated embodiment, the dotted circle 225 represents a transmitter coil of a transmitter unit disposed below the detection device 220. Further, each zone 224 includes a plurality of groups of concentric detection coils 222 disposed in each detection zone 224. It may be noted that a greater number of detection coils 222 per zone 224, or detection coils 222 having different shapes, and geometries, are envisioned within the purview of this application, and that the illustrated embodiment of FIG. 2B is a representative embodiment presented merely for illustrative purposes. A pair 226 of groups 228 and 230 of the detection coils 222 is formed in the manner illustrated. The individual groups 228 and 230 are disposed in the same geometric region, such that the detection coils 222 of the groups 228 and 230 experience similar strength of the primary magnetic field.

Figure 3A:
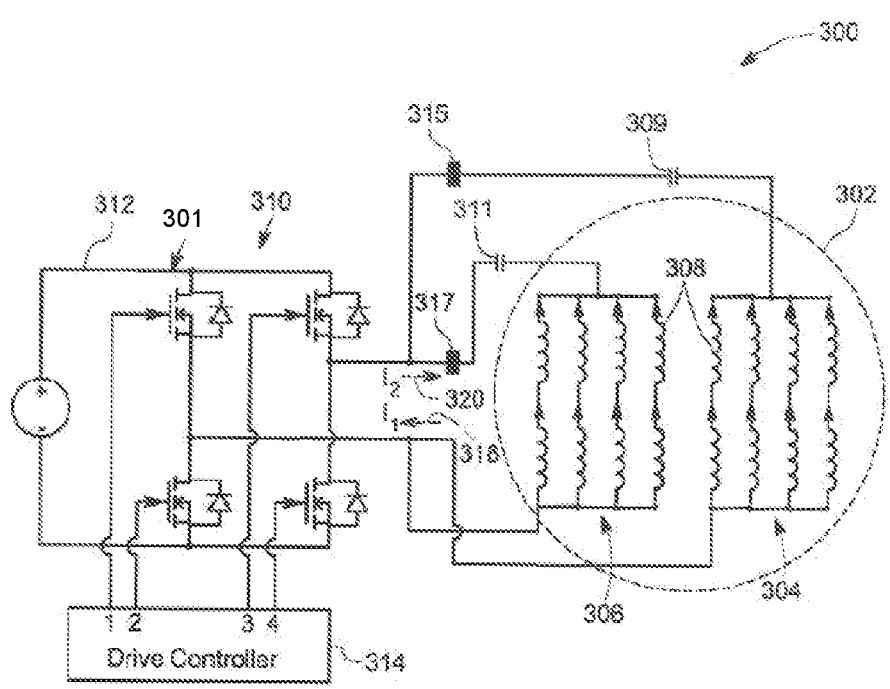
FIGS. 3A-3B are diagrammatical representations of portions of detection devices including a pair of groups of detection coils coupled to a drive sub-system, in accordance with aspects of the present specification.

FIG. 3A illustrates a portion 300 of a detection device of the present specification. The portion 300 includes a pair 302 of groups 304 and 306 of detection coils 308 disposed on a detection mat of the detection device. In the presently contemplated embodiment, the two groups 304 and 306 of the detection coils 308 are both excited by a single drive sub-system 310. The drive sub-system 310 includes a drive unit 301 and a drive controller 314. Further, both the groups 304 and 306 of the detection coils 308 are excited using the single drive unit 301 of the drive sub-system 310. The drive unit 301 includes an inverter/converter 312, capacitors 309 and 311, one or more compensator elements 315 and 317. It may be noted that capacitance values of the capacitors 309 and 311 may be fixed or variable. The drive controller 314 of the drive sub-system 310 is configured to control excitation voltages to the two groups 304 and 306 of the detection coils 308. As illustrated, the detection coils 308 within each group 304 and 306 may be coupled to one another in series connection, parallel connection, or both. The capacitors 309 and 311 are coupled to the groups 304 and 306 and form a resonant circuit with the detection coils 308 of the groups 304 and 306. The capacitors 309 and 311 help adjust currents driven in the detection coils 308 and hence modify the strength of magnetic field used to detect the foreign object on the detection mat of the detection device.

One or more detection coils 308 present near the foreign object may electromagnetically couple with the foreign object, this inductive coupling may result in change of the value of current being drawn by the detection coils 308. In one embodiment, the two groups 304 and 306 of the pair 302 of the detection coils 308 may have detectably similar impedance values in absence of the foreign object. For detecting presence of a foreign object, the differential current signal for the pair 302 is calculated based on a return current signal $I_1$ 318 of group 304 and an ongoing current signal $I_2$ 320 of group 306, or vice versa. In another embodiment, where the two groups 304 and 306 have detectably dissimilar impedances in absence of the foreign object, the one or more compensator elements 315 and 317 are used to ensure that the currents drawn by the two groups are similar in the absence of a foreign object. Non-limiting examples of the compensator elements 315 and 317 may include inductances, resistances, capacitances in series or parallel fashion or both.

Figure 3B:
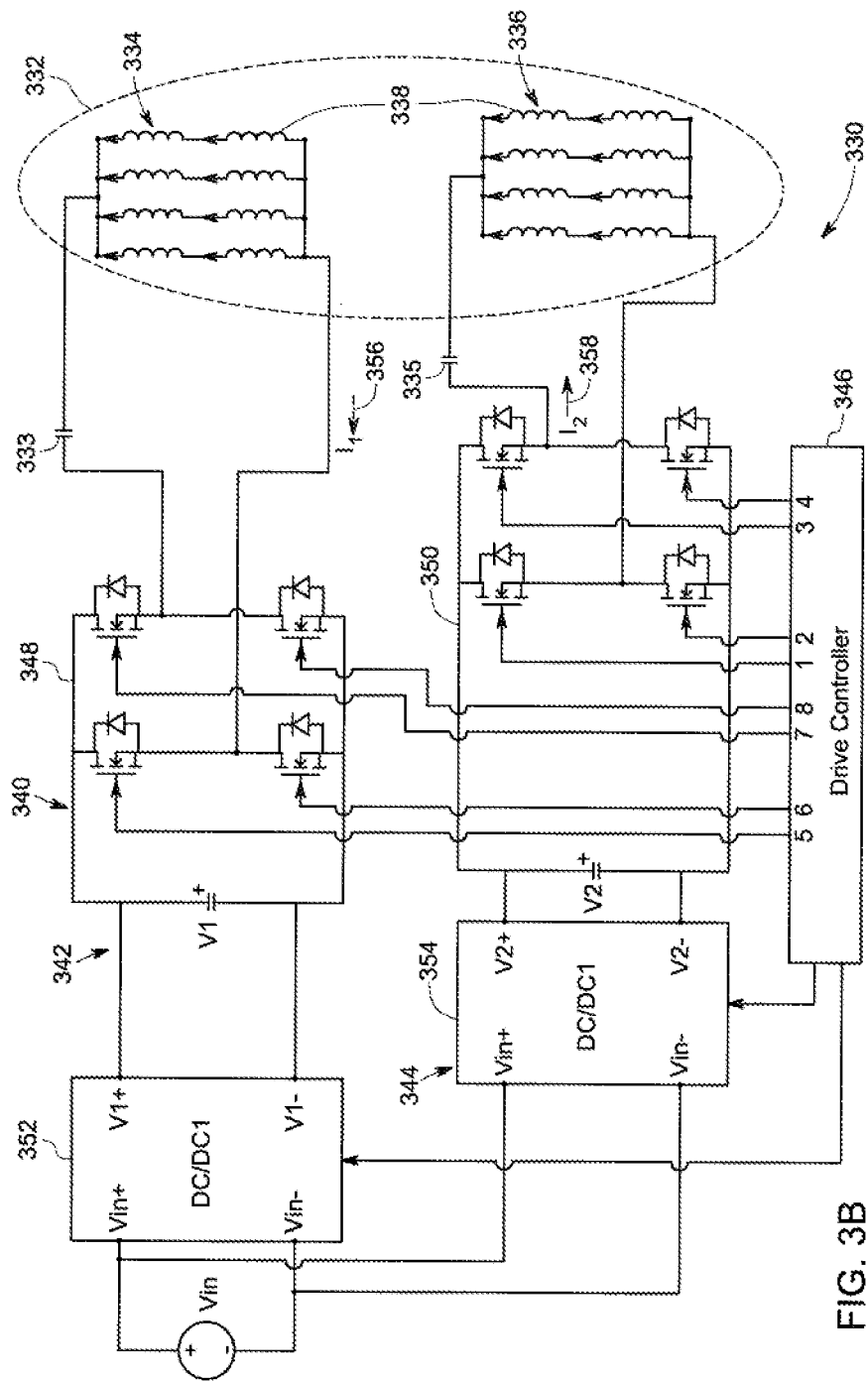

FIG. 3B illustrates another embodiment, where a portion 330 of a detection device of the present specification includes a pair 332 of a first group 334 and a second group 336 of detection coils 338 disposed on a detection mat of the detection device. The two groups 334 and 336 are coupled to the drive sub-system 340. The drive sub-system 340 includes two drive units 342 and 344 that are configured to excite first group 334 and second group 336, respectively. The two drive units 342 and 344 include inverters 348 and 350, DC/DC converters 352 and 354, and capacitors 333 and 335. Although not illustrated, one or both drive units 342 and 244 may further include one or more compensator elements. The capacitors 333 and 335 coupled to the groups 334 and 336 form a resonant circuit with the detection coils 338 of the groups 334 and 336 and help to adjust the current driven in the coils and hence the strength of magnetic field in the detection mat. The inverters 348 and 350 receive inputs from two DC/DC converters 352 and 354 drive the two groups 334 and 336, where the two groups 334 and 336 may have similar or dissimilar impedance values in absence of the foreign object.

The drive sub-system 340 further includes a drive controller 346 that may be configured to compensate for any difference in current values of the first and second groups 334 and 336, despite difference in the impedance values of the first and second groups 334 and 336. In embodiments, where the groups 334 and 336 have dissimilar impedance values, the drive controller 346 may be configured to adjust the currents that are used to drive the two groups 334 and 336 by one or more methods. In one embodiment, the drive controller 346 may be configured to vary voltage signals $V_1$ and $V_2$ of the inverters 348 and 350 by controlling the DC/DC stage converters 352 and 354. In another embodiment, a duty cycle of the inverters 348 and 350 may be varied without varying the frequency of operation of the inverters 348 and 350, to enable the first and second groups 334 and 336 of detection coils 338 to be driven by identical currents that are similar in magnitude and phase in absence of the foreign object. A differential current signal for the pair 332 is calculated based on a return current signal $I_1$ 356 of the first group 334 and an ongoing current signal $I_2$ 358 of the second group 336, or vice versa.

Figure 3C:
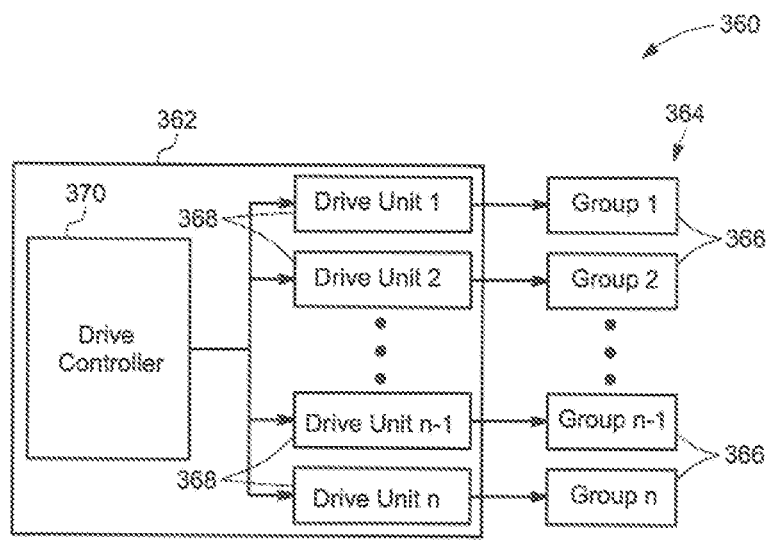
FIGS. 3C-3E are schematic representations of portions of detection devices having one or more drive sub-systems coupled to pairs of groups of detection coils, in accordance with aspects of the present specification.
Figure 3D:
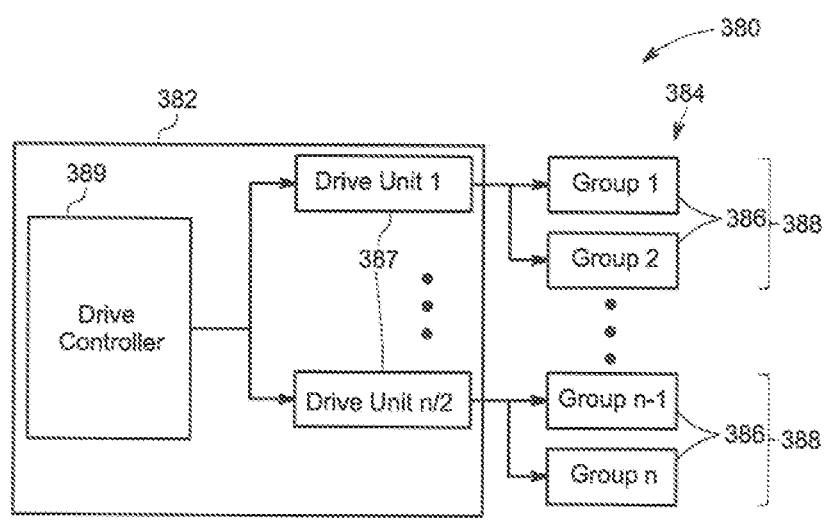
Figure 3E:
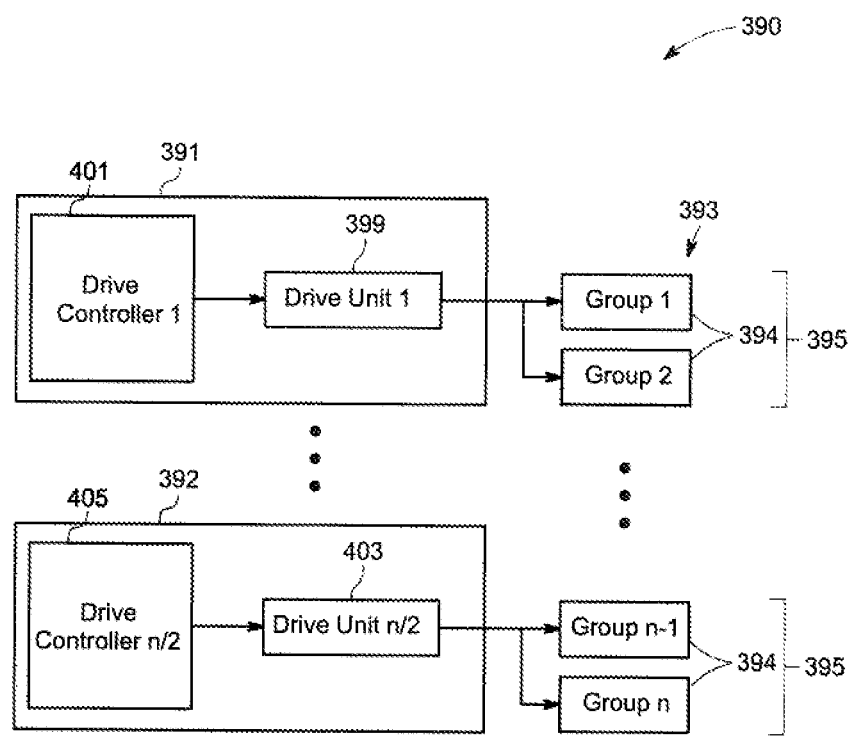

Turning now to FIGS. 3C-3E, FIGS. 3C-3E represent embodiments of operative coupling between the drive sub-systems and groups of detection coils. During detection, the groups of detection coils are coupled to one or more drive sub-systems of a detection system draw current from one or more drive units of the drive sub-system. When impedance values of both groups of a pair of groups are similar, the currents drawn by the two groups of the pair of groups of detection coils are such that the value of the differential current is negligible in absence of the foreign object. However, in instances where the impedances of the two groups of the pair of groups of detection coils are dissimilar, the drive controller provides compensation for one or both the groups of the pair of detection coils to ensure that the two groups are driven by similar current signals, in absence of a foreign object. The drive controller also controls excitation voltage, frequency and duration of excitation of the detection coils. The drive controller switches on the drive units to excite the groups of detection coils, and switches off the drive unit when the groups of detection coils do not need to be excited. The drive controller may use electronic circuitry for controlling the drive units. Non-limiting examples of the electronic circuitry include microcontrollers, field-programmable gate array (FPGA), semiconductor devices, logic gates, device drivers, oscillators and timers, or combinations thereof.

FIG. 3C illustrates a portion 360 of a detection device (not shown in FIG. 3C) having a drive sub-system 362 coupled to a plurality 364 of groups 366 of detection coils disposed on a detection mat. The drive sub-system 362 includes a plurality of drive units 368, where each drive unit 368 is coupled to a corresponding group 366 of detection coils. The drive sub-system 362 further includes a drive controller 370 that controls operations of the drive units 368.

FIG. 3D illustrates a portion 380 of a detection device (not shown in FIG. 3D) having a drive sub-system 382 coupled to a plurality 384 of groups 386 of detection coils disposed on a detection mat. The drive sub-system 382 includes a plurality of drive units 387. The drive sub-system 382 further includes a drive controller 389 that controls operations of the drive units 387. Pairs 388 of groups of detection coils are coupled to the drive sub-system 382 such that each pair 388 is coupled to a respective single drive unit 387.

FIG. 3E illustrates a portion 390 of a detection device (not shown in FIG. 3E), where the detection device employs two drive-subsystems 391 and 392 coupled to a plurality 393 of groups 394 of detection coils. The detection coils are disposed on a detection mat. Pairs 395 and 397 of groups 394 of detection coils are coupled to the drive sub-systems 391 and 392, respectively. The drive sub-system 391 includes a drive unit 399 and a drive controller 401, and the drive sub-system 392 includes a drive unit 403 and a drive controller 405.

Figure 4:
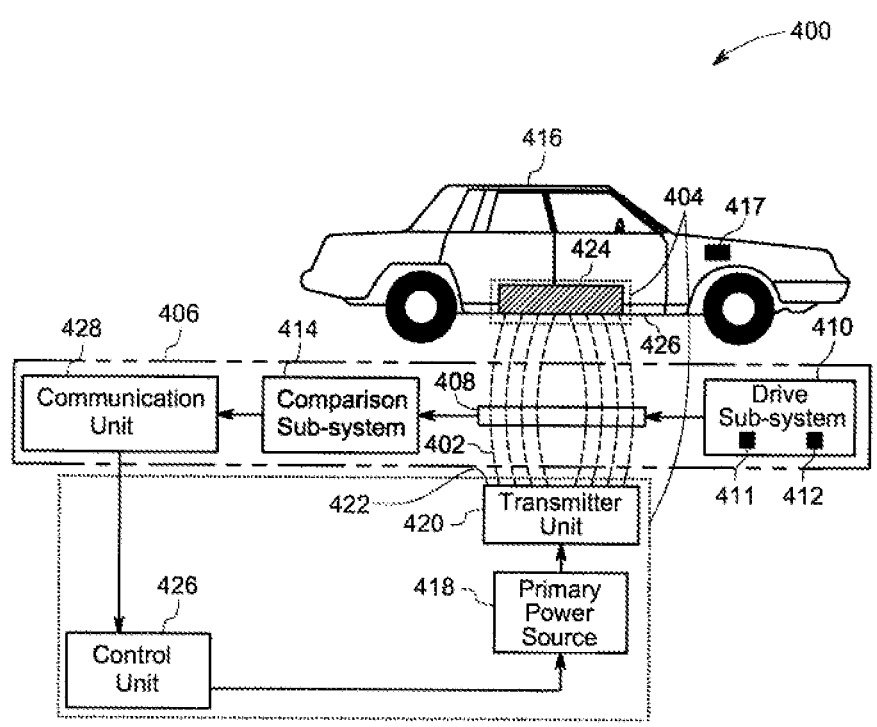
FIG. 4 is a diagrammatical representation of an example detection system having a detection device for detecting presence of a foreign object in an operative environment of a WPT system, in accordance with aspects of the present specification.

FIG. 4 illustrates an exemplary detection system 400 for detecting presence of a foreign object in an operative environment 402 of a WPT system 404. The system 400 includes a detection device 406 and the WPT system 404. The detection device 406 includes a detection mat 408 having a plurality of detection coils, and at least one pair of groups of detection coils for detecting presence of the foreign object in the operative environment 402 of the WPT system 404.

The detection device 406 also includes a drive sub-system 410. The drive sub-system 410 includes a drive unit 411 and a drive controller 412. Although not illustrated, the detection system 400 may include two or more drive sub-systems 410. Further, the drive sub-system 410 may include a plurality of drive units 411, or a plurality of drive controllers 412, or both. The drive sub-system 410 is operatively coupled to the detection mat 408 and configured to excite two or more groups of detection coils of the detection mat 408. The detection device 406 also includes a comparison sub-system 414 operatively coupled to the detection mat 408 and configured to receive a differential current signal from the detection mat. Further, the comparison sub-system 414 is configured to provide a control signal based on the differential current signal.

The WPT system 404 of the detection system 400 includes a primary power source 418 configured to supply power in the form of an alternating current (AC) voltage signal to a transmitter unit 420 of the WPT system 404. The transmitter unit 420 includes at least one transmitter coil (not shown in FIG. 4). The transmitter unit 420 is configured to receive the AC voltage signal from the primary power source 418 and generate a primary magnetic field or operative environment 402 in response to the received AC voltage signal.

The detection mat 408 is operatively coupled to the transmitter unit 420. Particularly, the detection mat 408 is disposed on the transmitter unit 420. In some embodiments, the detection mat 408 is directly disposed on a surface 422 of the transmitter unit 420. In some other embodiments, the detection mat 408 is positioned above the transmitter unit 408, such that the detection mat 408 is disposed in the operative environment of the WPT system 404. The detection mat 408 may be disposed and aligned with respect to the transmitter coil of the transmitter unit 420. The detection mat 408 may be disposed such that the transmitter coil is geometrically symmetrically positioned with respect to the detection mat 408. Further, the detection mat 408 may be a standalone mat 408, a plug and play mat, and may have one or more of a flexible, conformal, and rigid structure.

The WPT system 404 further includes a receiver unit 424 having at least one receiver coil configured to receive at least a portion of the primary magnetic field 402 generated by the transmitter unit 420. The receiver unit 424 may be disposed on an underside 426 of an apparatus that needs to be charged. In the illustrated embodiment, the receiver unit 424 is disposed on an underside 426 of an electric vehicle (EV) 416 that is to be charged using the WPT system 404. The EV 416 may include an external power supply, such as a battery 417. The WPT system 404 also includes a control unit 426, the control unit 426 controls operation of the primary power source 418 and is also operatively coupled to the detection device 406. The control unit 426 receives the control signal from the detection device 406. Further, the control unit 426 controls the supply of power from the primary power source 418 to the transmitter unit 420 based on the control signal.

In certain embodiments, the detection device 406 includes a communication unit 428 operatively coupled to the comparison sub-system 414, and configured to receive the control signal from the comparison sub-system 414. Further, the communication unit 428 is configured to communicate with the control unit 426 of the WPT system 404. In certain embodiments, the communication unit 428 may send a control signal to a user of the EV 416 or an operator of the respective EV charging station, for example by using mobile phone network, to communicate the presence and/or absence of the foreign object.

The differential current signal received by the comparison sub-system 414 from the detection coils of the detection mat 408 is converted to a voltage signal, referred to as a detection voltage signal. In some embodiments, the detection voltage signal is compared to a threshold value or a threshold voltage signal. The threshold value or threshold may be defined, for example by the user, based on the parameters and design of the detection device 406. If a value of the detection voltage signal is greater than a value of the threshold voltage signal, it indicates that currents drawn by the two groups of the pair of groups of detection coils is dissimilar, which indicates presence of a foreign object in the operative environment of the WPT system 404. Alternatively, if the value of the voltage signal is lower or equal to the value of the threshold voltage signal, it indicates that the currents drawn by the two groups of the pair of groups of detection coils are suitably similar, which indicates absence of a foreign object or presence of a very small foreign object (such as a coil, or the like) that may not adversely affect operation of the WPT in the operative environment of the WPT system 404.

Further, instances where the value of the detection voltage signal is greater than the value of the threshold voltage signal, a control signal may be communicated by the detection device 406 to the WPT system 404 to discontinue power supply to the transmitter unit 420. In some embodiments, the communication unit 428 communicates with the control unit 426, which in turn discontinues the power supply from the primary power source 418 to the transmitter unit 420. In another embodiment, where the transmitter unit 420 is made up of an array of coils, the control signal communicated by the detection device 406 to the control unit 426 will cause the control unit 426 to only excite a subset of the array of coils in the transmitter unit 420, thus avoiding the area where the foreign object is detected.

Figure 5:
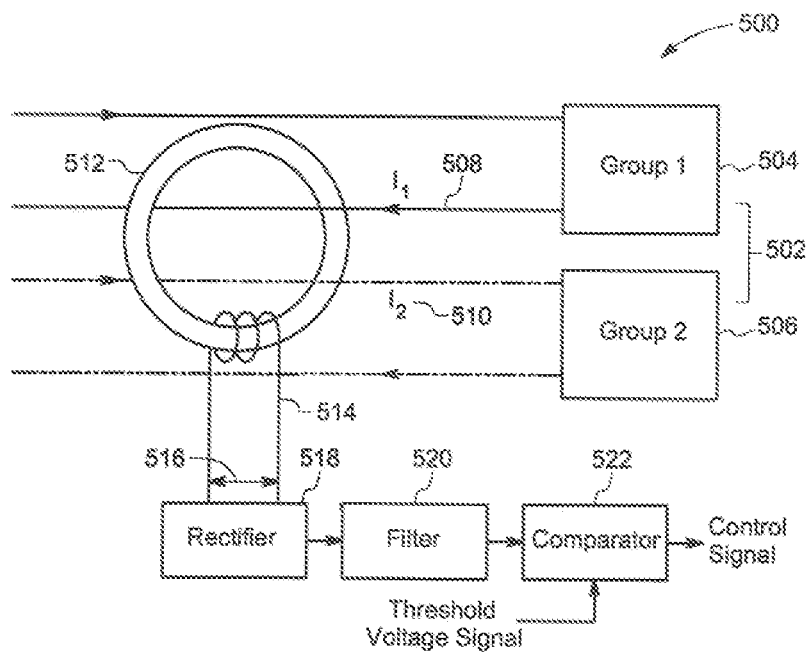
FIG. 5 is a diagrammatical representation of an example comparison sub-system of a detection device, in accordance with aspects of the present specification.

FIG. 5 illustrates an exemplary comparison sub-system 500 operatively coupled to a pair 502 of groups 504 and 506 of detection coils of a detection mat. The illustrated example of FIG. 5 is a non-limiting example of measuring a differential current, it may be noted that other methods for measuring differential may also be employed in the present specification, where other methods may include sensing individual currents and finding the difference between the individual current using electronics, such as, but not limited to, a differential amplifier. A differential current signal from the pair 502 may be determined by using an ongoing current signal to one group and a returning current signal from the other group of the pair of groups. In the illustrated embodiment, a retuning current signal $I_1$ 508 from the group 504 and an ongoing current signal $I_2$ 510 from the group 506 are used to derive the differential current signal for the pair 502 of groups 504 and 506.

When the two current signals 508 and 510 are passed through a magnetic core 512, the difference in current signals 508 and 510 generates a flux linkage in the core and induces a corresponding detection voltage signal, represented generally by reference numeral 516, in an electrical winding 514 wound around the magnetic core 512. This detection voltage, under conditions of core not magnetically saturated, is proportional to the difference between current signals 508 and 510 and is representative of a measure of the differential current between the two groups 504 and 506 of the pair 502 of groups.

The comparison sub-system 500 also includes a rectifier 518 that receives and rectifies the detection voltage signal. An optional filter 520 filters the voltage signal before sending the same to a comparator 522. In one example, the filter 520 is configured to filter out high frequency components from the measurement. The comparator 522 compares the filtered voltage signal with a threshold voltage signal, and accordingly a control signal is communicated to the WPT system, such as the WPT system 404 of FIG. 4.

Figure 6:
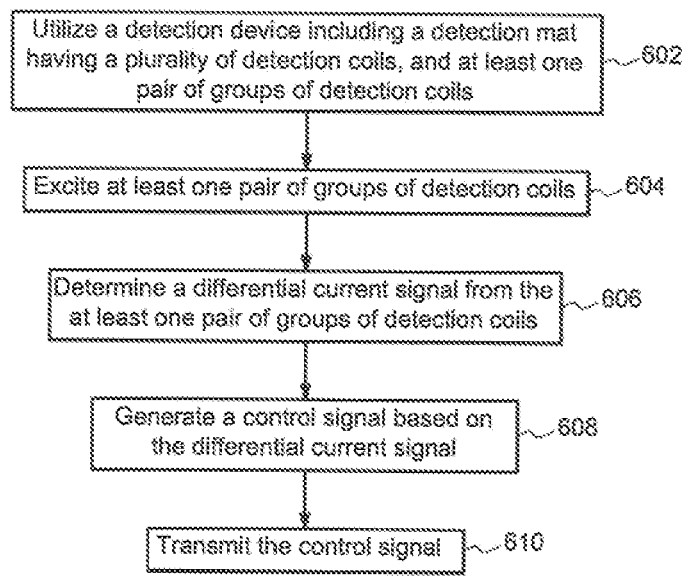
FIGS. 6-7 are example methods for detecting presence of a foreign object in an operative environment of a WPT system, in accordance with aspects of the present specification.

FIG. 6 is an example method flow chart 600 for detecting presence of a foreign object in an operative environment of a system. In one example, the system may be a WPT system. At block 602, a detection device is utilized by disposing a detection mat of the detection device on a transmitter unit of the WPT system. The detection mat may be placed directly on the transmitter unit, or the detection mat may be placed above the transmitter unit such that it is not in physical contact with the transmitter unit. The detection mat includes a plurality of detection coils, and at least one pair of groups of detection coils, where the at least one pair of groups of detection coils comprises a first group of detection coils and a second group of detection coils, and where the first group of detection coils includes a first impedance value, and a second group of detection coils comprises a second impedance value.

At block 604, at least one pair of groups of detection coils is excited. In some embodiments, the groups of a pair may be disposed symmetrically with respect to a primary magnetic field. In some other embodiments, the groups of the pair are disposed in the same geometric location. In certain embodiments, the groups of the pair may be disposed in two different detection zones, detection zones may be selected such that the two detection zones of the pair of detection zones are placed symmetrically with respect to the magnetic field of the transmitter unit.

In certain embodiments, more than one pair of groups of detection coils may be excited. In one example, the various pairs of the groups of detection coils may be excited simultaneously for detecting presence of the foreign object. In one embodiment, different pairs of the groups of detection coils may be selected such that entire surface of the detection mat is excited for detecting presence of the foreign object. In some embodiments, different pairs may be excited at different instances in time. In another embodiment, two or more pairs may be excited simultaneously. In one embodiment, the various pairs of the groups may be excited in a time sequential order.

Further, the pairs of the groups may be excited prior to starting the wireless power transfer operation of the WPT system for the receiver unit, and also during the wireless power transfer operation of the WPT system. The pair of the groups may be excited intermittently, or at a periodic interval. Further, the detection coils corresponding to different pairs of detection zones are excited at different instances in time. Moreover, different voltage signals are provided to the detection coils of the pair of detection coils having dissimilar impedance values such that the detection coils of the pair of detection coils are driven by identical current signals similar in magnitude and phase in absence of the foreign object.

At block 606, a differential current signal is determined for the excited detection coils. In one embodiment, the differential current signal is determined using an ongoing current signal for one group of the pair of groups of detection coils and a return current signal for the other group of the pair of groups detection coils. In embodiments, where two or more pairs are excited simultaneously, corresponding individual differential current signals may be determined to detect presence of the foreign object. Based on the differential current signal, presence or absence of foreign object in the operative environment of the WPT system is determined.

Subsequently, at block 608, a control signal is generated based on the differential current signal(s). At block 610, the generated control signal is transmitted. In one example, the control signal is transmitted to the control unit of the WPT system. In some embodiments, power supply to the transmitter unit of the WPT system is continued, adjusted or discontinued based on the control signal received by the control unit of the WPT system.

Figure 7:
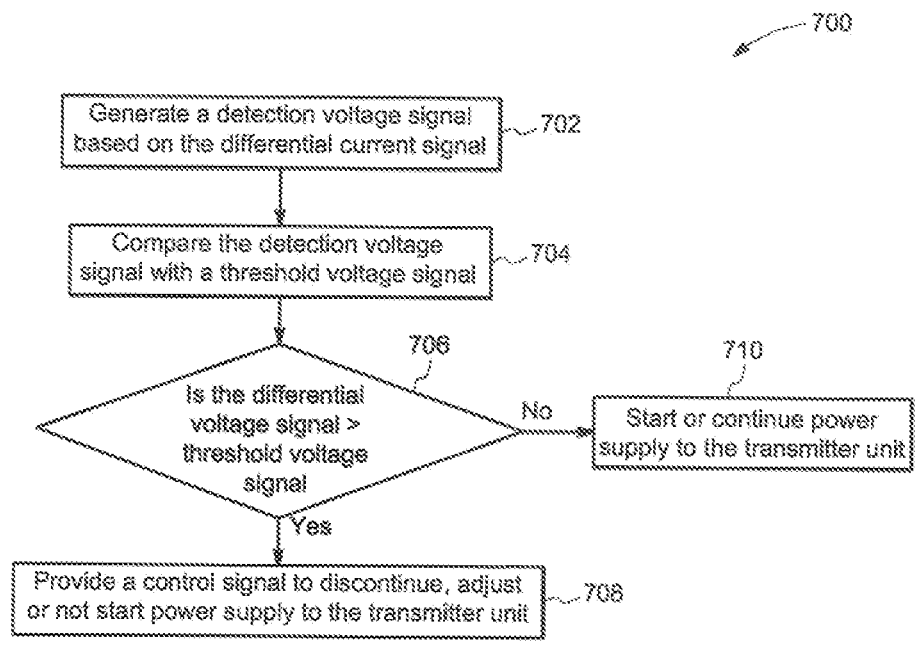

FIG. 7 is a method flow chart 700 for a method for controlling the power supply of the transmitter unit based on the control signal. At block 702, a detection voltage signal is generated proportional to the differential current signal using, for example, an electrical winding and a magnetic core of the comparison sub-system. At block 704, the detection voltage signal is compared with a threshold. In some embodiments, this threshold may be a threshold value or threshold voltage signal. The threshold voltage signal may be a predetermined voltage signal based on the specifics of the WPT system.

At decision block 706, if the detection voltage signal is found to be greater than the threshold voltage signal, a control signal is communicated to the WPT system to not start, adjust, or discontinue power supply of the transmitter unit (block 708). Alternatively, at decision block 706 if the detection voltage signal is lower than the threshold voltage signal, either no communication is made to the WPT system, or a control signal indicating that the power supply of the transmitter unit be continued or started may be communicated to the WPT system (block 710).

The detection may be performed in real-time or near real-time. Near real-time detection may be performed such that the control signal is generated and communicated in a period of few microseconds to few milliseconds from the time of starting the detection. In certain embodiments, the detection mat may be scanned for any foreign object at a periodic interval at a determined rate, for example, once every second. Upon detection of the foreign object, a communication signal is sent to the transmitter unit.

Figure 8:
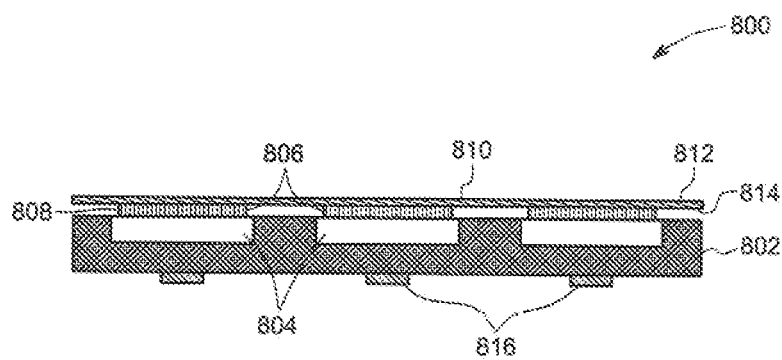
FIG. 8 is a cross sectional view of a detection mat, in accordance with aspects of the present specification.

FIG. 8 is a cross sectional view of a detection mat 800, in accordance with aspects of the present specification. In some embodiments, the detection mat 800 may be a stand-alone structure detachably coupled to a transmitter unit, such as the transmitter unit 420 of FIG. 4. In one example, the detection mat 800 may be a plug and play structure. The detection mat 800 includes a substrate 802 having one or more printed circuit boards (PCBs) 804. The substrate 802 may include electrically insulating materials. In some embodiments, the substrate 802 itself may be a printed circuit board (PCB).

Further, groups 806 of detection coils 808 may be disposed on the substrate 802. In one embodiment, the groups 806 of the detection coils 808 may be disposed on respective PCBs 804. In some embodiments, the detection coils 808 may be disposed on the substrate 802 or may be embedded in the substrate 802 for user safety and aesthetics. The detection coils 808 may also be printed on flexible or regular printed circuit board. In certain embodiments, the detection coils 808 may be printed, molded, woven, or additively manufactured on the substrate 808 or the PCBs 804. It may be noted that each of the detection coils 808 may be compact and wound within a thin gauge wire.

A cover layer 810 may be disposed on the detection coils 808. The cover layer 810 has a first side 812 and a second side 814. In certain embodiments, the detection coils 808 may be directly disposed on the second side 814 of the cover layer 810. In some of these embodiments, the detection coils 808 may not be disposed on the PCBs 804. Further, suitable electronics 816 may be provided to the substrate 802 to enable operative coupling of the detection mat 800 with a drive sub-system and a comparison sub-system of a detection device.

The substrate 802 and the cover layer 810 may include a flexible material, a hard material, or a combination thereof. The cover layer 810 includes a thermally conductive and electrically insulating (TCEI) material. In one embodiment, the thermally conductive and electrically insulating (TCEI) material may include elastomers or thermoplastics with fillers that are wear resistant. In one embodiment, the elastomers may be silicone rubber. The fillers may be TCEI fillers such as aluminum oxide, aluminum nitride, beryllium oxide, boron nitride, graphene oxide, silicon carbide, and silicon nitride. Similarly, the thermoplastics may be polyolefins, polycarbonate, poly (methyl-methacrylate) (PMMA), and polyesters. Also, in certain embodiments, the substrate 802 and the cover layer 810 may be foldable along with the detection coils 808. In one embodiment, the detection mat 800 may be a conformable structure. To that end, when the detection mat 800 is disposed on a transmitter unit, the detection mat 800 may be configured to generally conform to the gradients and curves of the surface of the transmitter unit. In some embodiments, the cover layer 810 may form an enclosure around the substrate 802, detection coils 808, and may be around the electronics 816.

In one embodiment, the detection mat 800 may be integrated with a standard SAE transmitter system. In certain embodiments, dimensions of the detection mat 800 may be in a range from about 0.5 m to about 2.2 m. The detection mat 800 may be suitably large to cover a surface area of a transmitter coil. In some examples, the detection mat 800 may have a length in a range from about 0.5 m to about 2.2 m, and a width in a range from about 0.5 m to about 2.2 m. Also, the detection mat 800 may have a thickness that is in a range from about 1 mm to about 20 mm. In one embodiment, the detection mat 800 may be a unitary structure. In another embodiment, the detection mat 800 may be formed by integrating separate individual pieces.

Advantageously, the device, system and method of the present technique are simple in construction and do not require any complicated assembly. Further, the present technique is very sensitive and can detect the presence of a foreign object soon after the wireless power transfer is started. This helps in minimizing the wastage of power. Embodiments of the present specification provide a high sensitivity, simple, and accurate system to detect foreign objects placed in the operative environment of the WPT system. Further, the detection device of the present specification can be deployed in existing WPT systems, with minimal to no changes or adjustments required to be made in the existing WPT systems. Advantageously, the device, systems and methods of the present specification enable a safe working environment during wireless power transfer of an electric vehicle (EV), but either discontinuing the wireless of the EV upon detection of the foreign object, or by raising an alarm upon detection of the presence of the foreign object in the operative environment of the WPT system.

While only certain features of the invention have been illustrated and described herein, many modifications and changes will occur to those skilled in the art. It is, therefore, to be understood that the appended claims are intended to cover all such modifications and changes as fall within the scope of the invention.

We claim:

1. A detection device, comprising:
at least one pair of groups of one or more detection coils, the at least one pair of groups of one or more detection coils including a first group of one or more detection coils and a second group of one or more detection coils, wherein the first group of one or more detection coils has a first impedance and the second group of one or more detection coils has a second impedance that is different from the first impedance;
one or more drive sub-systems operatively coupled to the at least one pair of groups of one or more detection coils and configured to excite the first group of one or more detection coils using a first voltage and the second group of one or more detection coils using a second voltage, wherein the second voltage is different from the first voltage, wherein one of the first voltage or the second voltage comprises a voltage that compensates for a difference between the first impedance and the second impedance such that a difference between a first current of the first group of one or more detection coils and a second current of the second group of one or more detection coils is less than a threshold difference in an absence of a foreign object; and
a comparison sub-system operatively coupled to the at least one pair of groups of one or more detection coils and configured to:

generate a detection voltage signal that is proportional to a difference between the first current and the second current, and generate a control signal indicating a presence of the foreign object when the detection voltage signal is greater than a threshold value.

2. The detection device of claim 1, wherein the first impedance and the second impedance are such that the difference between the first current and the second current is less than the threshold difference in the absence of the foreign object.

3. The detection device of claim 2, wherein the first impedance is within a threshold percentage of the second impedance.

4. The detection device of claim 1, wherein further comprising one or more compensators operatively coupled to at least one of the first group of one or more detection coils or the second group of one or more detection coils, the one or more compensators configured to adjust at least one of the first current or the second current such that the difference between the first current and the second current is less than the threshold difference in the absence of the foreign object.

5. The detection device of claim 1, wherein the first current comprises an input current to the first group of one or more detection coils and the second current comprises a resultant current output from the second group of one or more detection coils.

6. The detection device of claim 1, wherein the one or more drive sub-systems are configured to intermittently or periodically excite the first group of one or more detection coils and the second group of one or more detection coils.

7. The detection device of claim 1, further comprising a communication unit configured to communicate the control signal to a control unit of a transmitter unit of a wireless power transfer (WPT) system, wherein the transmitter unit is configured to control a supply of power to a receiver unit of the WPT system based on the control signal.

8. The detection device of claim 1, wherein the comparison sub-system further includes at least one magnetic core, through which the first current passes in a first direction and the second current passes in a second direction such that the difference between the first current and second current generates a flux linkage in the at least one magnetic core and induces the detection voltage signal that is proportional to the difference between the first current and the second current.

9. The detection device of claim 1, wherein the detection device is included in a detection mat.

10. The detection device of claim 1, wherein the first and second groups are symmetrically located with respect to a primary magnetic field of a transmitter coil.

11. A detection system, comprising:
a detection device, comprising:
at least one pair of groups of one or more detection coils, the at least one pair of groups of one or more detection coils including a first group of one or more detection coils and a second group of one or more detection coils, wherein the first and second groups are symmetrically located with respect to a primary magnetic field of a transmitter coil, and wherein the first group of one or more detection coils has a first impedance and the second group of one or more detection coils has a second impedance that is different from the first impedance,
one or more drive sub-systems operatively coupled to the at least one pair of groups of one or more detection coils and configured to excite the first group of one or more detection coils using a first voltage and the second group of one or more detection coils using a second voltage, wherein the second voltage is different from the first voltage, wherein one of the first voltage or the second voltage comprises a voltage that compensates for a difference between the first impedance and the second impedance such that a difference between a first current of the first group of one or more detection coils and a second current of the second group of one or more detection coils is less than a threshold difference in an absence of a foreign object, and
a comparison sub-system operatively coupled to the at least one pair of groups of one or more detection coils and configured to generate a detection voltage signal that is proportional to a difference between the first current and the second current, and generate a control signal indicating a presence of the foreign object
when the detection voltage signal is greater than a threshold value; and a transmitter unit of a wireless power transfer (WPT) system, comprising:
the transmitter coil configured to receive an AC voltage signal from a primary power source and use the AC voltage signal to transmit power to a receiver unit, and
a control unit configured to:
receive the control signal from the detection device, and
control a transmission of the power from the transmitter unit to the receiver unit based on the control signal.

12. The detection system of claim 11, further comprising:
one or more compensators operatively coupled to either or both at least one of the first group of one or more detection coils or the second group of one or more detection coils, the one or more compensators configured to adjust at least one of the first current or the second current such that the difference between the first current and the second current is less than the threshold difference in the absence of the foreign object.

13. A method comprising:
exciting a first group of one or more detection coils using a first voltage and a second group of one or more detection coils using a second voltage, wherein:
the first and second groups are symmetrically located with respect to a primary magnetic field of a transmitter coil,
the first group of one or more detection coils has a first impedance and the second group of one or more detection coils has a second impedance that is different from the first impedance,
the second voltage is different from the first voltage, and
one of the first voltage or the second voltage compensates for a difference between the first impedance and the second impedance such that a difference between a first current of the first group of one or more detection coils and a second current of the second group of one or more detection coils is less than a threshold difference in an absence of a foreign object;
generating a detection voltage signal that is proportional to a difference between the first current and the second current; and generating a control signal indicating a presence of the foreign object when the detection voltage signal is greater than a threshold value.

14. The method of claim 13,
wherein either or both at least one of the first group of one or more detection coils or the second group of one or more detection coils are operably coupled to one or more compensators configured to adjust at least one the first current or the second current such that the difference between the first current and the second current is less than the threshold difference in the absence of the foreign object.

15. The method of claim 13, further comprising transmitting the control signal to a transmitter unit configured to control transmission of wireless power based on the control signal.

\* \* \* \* \*

UNITED STATES PATENT AND TRADEMARK OFFICE
CERTIFICATE OF CORRECTION

| | | |
|---|---|---|
| PATENT NO. | : 12,296,698 B2 | Page 1 of 1 |
| APPLICATION NO. | : 18/338890 | |
| DATED | : May 13, 2025 | |
| INVENTOR(S) | : Viswanathan Kanakasabai et al. | |

It is certified that error appears in the above-identified patent and that said Letters Patent is hereby corrected as shown below:

On the Title Page
Column 1, (73) Assignee, Line 1, After "Licensing,", insert --LLC,--

In the Claims
In Column 18, Line 21, In Claim 11, after "object", delete "¶"
In Column 18, Line 23, In Claim 11, after "and", insert --¶--
In Column 18, Lines 36-37, In Claim 12, after "coupled to", delete "either or both"
In Column 19, Line 5, In Claim 14, after "wherein", delete "either or both"
In Column 19, Line 8, In Claim 14, after "at least one", insert --of--

Signed and Sealed this
Nineteenth Day of August, 2025

Coke Morgan Stewart
*Acting Director of the United States Patent and Trademark Office*